(12) United States Patent
Lepola

(10) Patent No.: US 7,628,177 B2
(45) Date of Patent: Dec. 8, 2009

(54) LATERAL INTERFACE DEVICE WITH FLEXIBLE HOUSING

(75) Inventor: William Lepola, Magnolia, TX (US)

(73) Assignee: Energy Maintenance Service I LLC, Houston, TX (US)

(*) Notice: Subject to any disclaimer, the term of this patent is extended or adjusted under 35 U.S.C. 154(b) by 7 days.

(21) Appl. No.: 11/746,213

(22) Filed: May 9, 2007

(65) Prior Publication Data
US 2007/0261751 A1 Nov. 15, 2007

Related U.S. Application Data

(60) Provisional application No. 60/798,899, filed on May 9, 2006.

(51) Int. Cl.
*F16L 55/16* (2006.01)
(52) U.S. Cl. .................. 138/98; 138/97; 405/150.1; 405/184.2
(58) Field of Classification Search ............ 138/97, 138/98, 93; 405/150.1, 184.2
See application file for complete search history.

(56) References Cited

U.S. PATENT DOCUMENTS

| | | | | |
|---|---|---|---|---|
| 2,474,047 A | * | 6/1949 | Gorzkowski ............. 220/232 |
| 2,481,013 A | * | 9/1949 | Henderson .................. 138/90 |
| 3,618,639 A | * | 11/1971 | Daley et al. ................... 138/97 |
| 5,010,440 A | * | 4/1991 | Endo ........................... 361/215 |
| 5,915,419 A | * | 6/1999 | Tweedie et al. ............... 138/98 |
| 5,950,682 A | * | 9/1999 | Kiest, Jr. ...................... 138/98 |
| 6,001,212 A | * | 12/1999 | Polivka et al. .............. 156/287 |
| 6,029,726 A | * | 2/2000 | Tweedie et al. ............. 156/423 |
| 6,068,725 A | | 5/2000 | Tweedie et al. |
| 7,052,567 B1 | * | 5/2006 | Blackmore et al. ............ 156/94 |
| 7,073,536 B2 | * | 7/2006 | Blackmore et al. ............ 138/98 |
| 2006/0130923 A1 | * | 6/2006 | Lepola et al. ................. 138/98 |
| 2006/0174957 A1 | * | 8/2006 | Blackmore et al. ............ 138/98 |
| 2007/0261222 A1 | * | 11/2007 | Lepola ..................... 29/402.01 |

* cited by examiner

Primary Examiner—James F Hook
(74) Attorney, Agent, or Firm—David McEwing

(57) ABSTRACT

The invention comprises a lateral interface pipe repair device containing a housing with fluid sealable flexible walls dimensioned to fit within a main pipe and further comprising a first end and a second end wherein the first end and second end are held in fixed orientation by support rods and end plates external to the flexible housing. The device also includes a bladder mounting flange fluid sealably attached to the flexible housing wall, and a heatable and inflatable elastomeric bladder dimensioned to fit within the housing when the bladder is deflated and evertable through the bladder mounting flange into a lateral pipe when inflated.

9 Claims, 5 Drawing Sheets

US 7,628,177 B2

LATERAL INTERFACE DEVICE WITH FLEXIBLE HOUSING

RELATED APPLICATIONS

This application claims the benefit of and priority to provisional application No. 60/798,899, entitled "Lateral Interface Device with Flexible Housing" file May 9, 2006. This application incorporates herein by reference the non provisional application of William Lepola entitled Lateral Interface Device Extended Bladder filed May 9, 2007.

BACKGROUND OF INVENTION

1. Field of Use

The device subject of this disclosure pertains to a flexible walled inflatable device that can be inserted into a pipe and located at the interface of the pipe with a second lateral pipe. The device can be inflated by fluid pressure, causing an everting bladder to extend from the device and extend into the lateral pipe. The device and everting bladder may carry a thermal responsive pipe repair material.

2. Related Technical Art

Numerous devices and methods for the in situ repair of underground pipes are known.

SUMMARY OF INVENTION

An in situ pipe lateral interface pipe repair device including a housing with an inner annulus and fluid sealable flexible walls. The device also includes a first end and a second end wherein the first end and second end are held in fixed orientation by support rods on the outside of the housing and extending to housing end plates.

Also included in the device is a bladder mounting flange fluid that is sealably attached to the flexible housing wall and an electrically heatable and fluid inflatable elastomeric bladder dimensioned to fit within the housing when the bladder is deflated. The bladder is evertable through the bladder mounting flange into a lateral pipe when inflated. The pipe repair device also includes at least one inflatable bladder to hold the device in a main pipe.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF THE DISCLOSURE

The invention comprises a device for installing a repair material to the juncture of two pipes, hereinafter referred to as a "main pipe" and a "lateral pipe". The juncture of the two pipes is termed a "lateral interface". This disclosure of the invention incorporates by reference Blackmore U.S. Pat. No. 7,073,536.

The device includes flexible side walls forming part of a housing. The side walls may be in a cylindrical or tubular form. The housing can hold a deflated, inverted bladder. The bladder may include electric resistive heating elements. A repair material may be placed on the outside of the bladder. The repair material may be impregnated with a thermally responsive material. Such materials are known in the industry. The repair material may have a cylindrical portion that is dimensioned to fit within the lateral pipe and a wider brim portion for attachment to the main pipe.

The housing may include rigid end components dimensioned to fit with the flexible side walls. One of the end fixtures may contain fluid ports for inflation or deflation of the housing and bladder. It will be appreciated that the housing and bladder are fluid sealed.

One end of the end fixture may contain at least one electrical connector used for powering the electrical resistive heater of the bladder.

The device may include a second electrically powered heater or pad that is fitted on the exterior of the housing. The heating pad is used to heat a brim portion of the repair material pressed to the interior of the main pipe.

The heating pad may be used in combination with separate inflatable bladders (hereinafter "actuator bladders") attached to the outside of the housing. An end component may contain fluid ports for the inflation and deflation of the actuator bladders.

The flexible housing allows the inflating and everting bladder to enter a lateral pipe that is oriented to the main pipe at an angle other than 90°.

The device includes connecting support rods extending and attached to each rigid housing end. The rods are placed external to the flexible housing wall to further protect the housing during transport of the device through the pipe interior.

Figure 1:
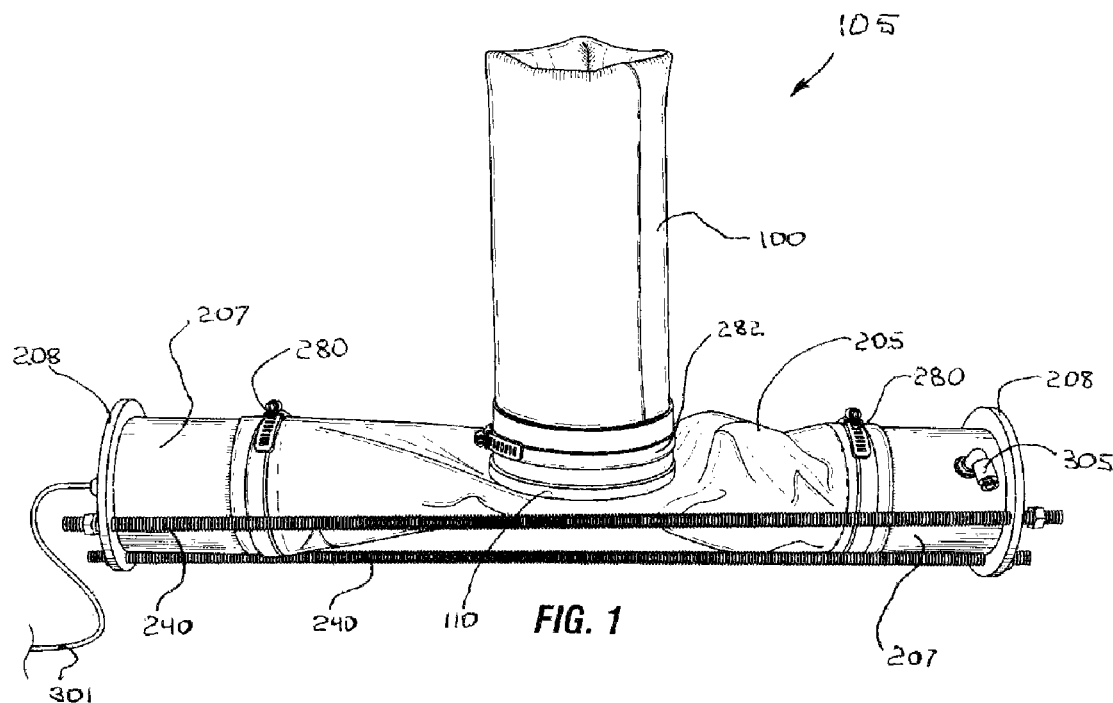
FIG. 1 illustrates a side view of the device, including the everted flexible and heatable bladder.

FIG. 1 illustrates a side view of one embodiment of the device 105, including an everted flexible and heatable bladder 100. It will be appreciated that in this embodiment the bladder is mounted and clamped over a flange 110. The flange is fluid sealablely attached to the flexible housing wall component 205. (During the transport and maneuvering of the device through pipes, the deflated bladder is inverted and stored within an internal cavity within the housing. This facilitates transport through the pipe and protects the bladder and repair material.) Also illustrated are the flexible housing wall component 205 and rigid wall components 207. External housing support rods 240 mounted to end plates 208 are also illustrated. A fluid port 305 for inflating and deflating the bladder is also illustrated. Also illustrated are clamps 280 used to form fluid sealable connections between the rigid and flexible housing components and a clamp 282 holding the everted bladder to a flange mounted in the flexible housing component. (Not illustrated are the components utilized in pressing and curing the repair liner 'brim' that is installed to the main pipe wall.) Also illustrated is a cable 301 or other device for communicating electrical power to the device.

Figure 2:
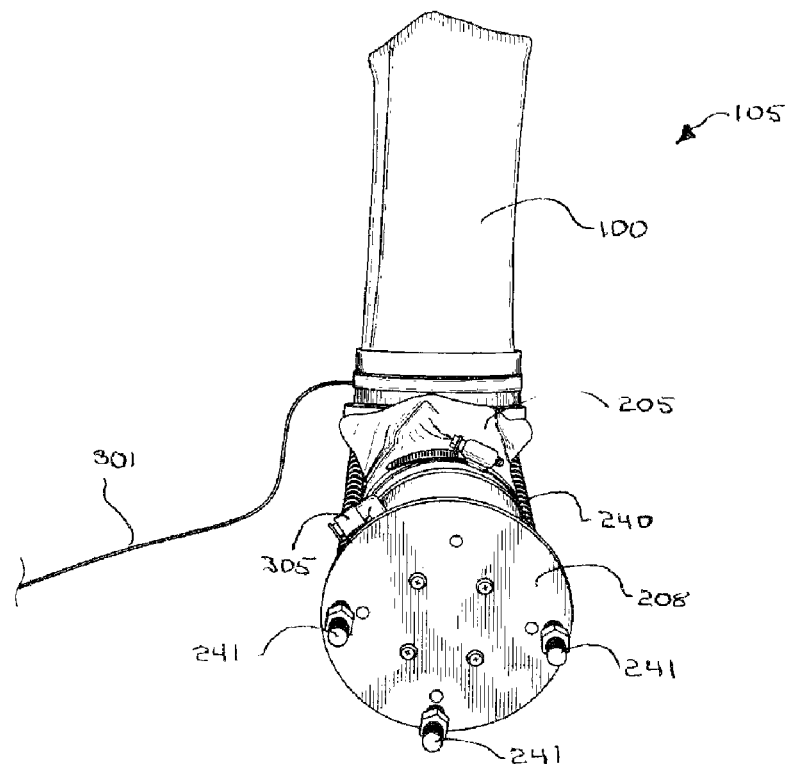
FIG. 2 illustrates an end view of the device, including the housing end plate and housing support rod attachment mechanisms.

FIG. 2 illustrates an end view of the device 105, including the housing end plate 208 and housing support rod attachment mechanisms 241. The support rods 240 may be made of metal or other material having sufficient strength and stiffness to maintain the dimensional stability of the assembled device with the end plates. The support rods may define the length of the device and the overall longitudinal orientation.

Also illustrated in FIG. 2 are the electrical power cable 301 extending from the opposite end of the device and the fluid connection 305. The everted bladder 100 extending from the flexible housing component 205 is also illustrated.

Figure 3:
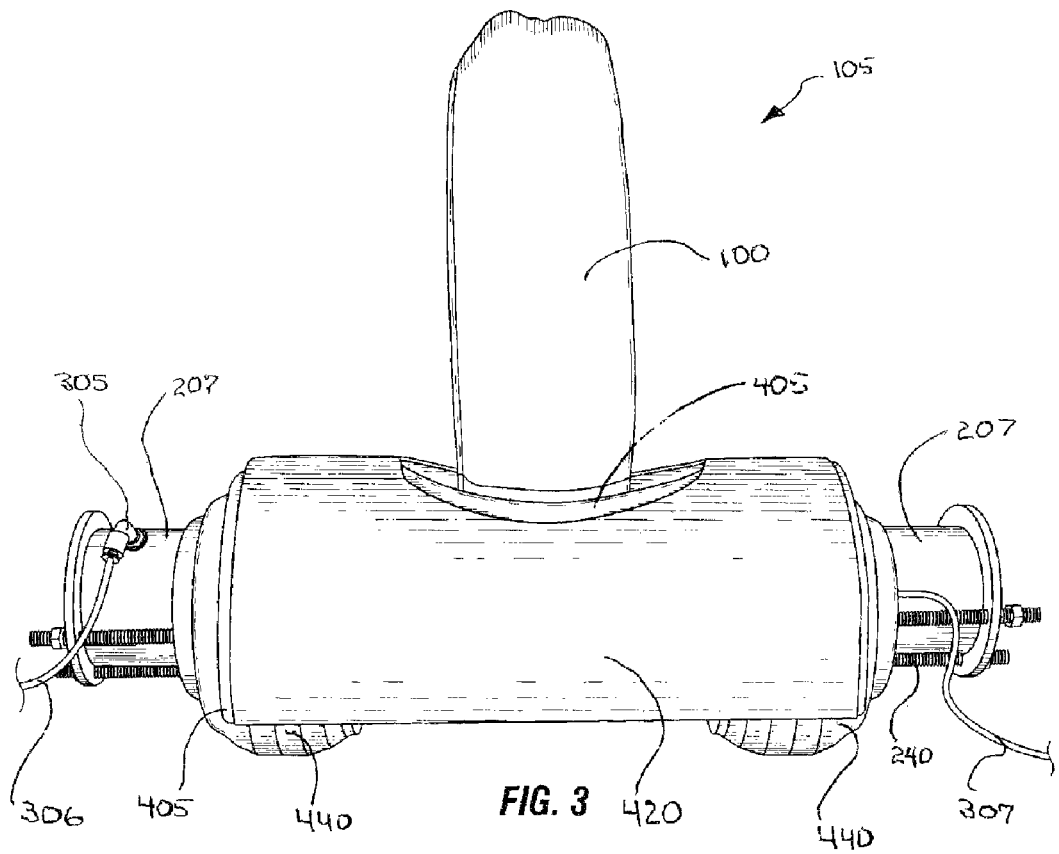
FIG. 3 illustrates the assembled device. The everted bladder (under positive fluid pressure) is illustrated.

FIG. 3 illustrates the assembled components of an embodiment of the device 105. The everted bladder 100 (under positive fluid pressure) is illustrated. The lateral repair material (not shown) fits over the everted bladder. It will be appreciated that the flexible walls of the inflated housing (obscured by the heating bladder 420 and support base component 405) permit the bladder to assume an angle other than 90° to the housing. Also illustrated are the two actuator bladders 440 that press the support base component and mounted heating pad into a deployed position to press the brim of the repair material (not shown) to the main pipe wall. The support rods 240 are also illustrated. Also illustrated are fluid hoses 306, 307 and the fluid connection component 305 on the rigid section of the housing wall 207.

Figure 4:
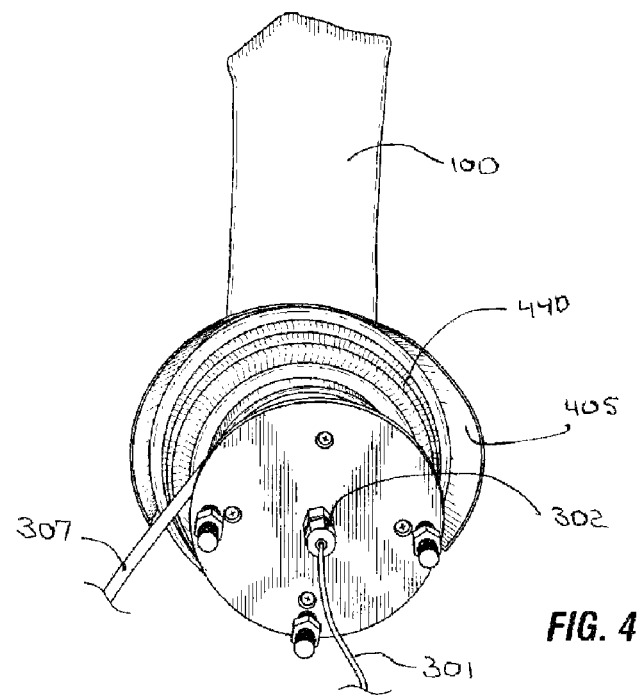
FIG. 4 illustrates an end view of the device showing the actuator bladder and the support base component mounted on top of the actuator bladder.

FIG. 4 illustrates an end view of an embodiment of the device showing the actuator bladder 440 and the support base component 405 mounted on top of the actuator bladder. It will be appreciated that the actuator bladders are deflated with a reduced diameter during transportation of the device through the pipe. Illustrated is the actuator bladder positioned on the outer circumference of the housing. Also illustrated is an electrical connection port 302 and electrical power cable 301 extending from the end plate 208. Electrical power must be communicated to the heating bladder and the heating pad.

Figure 5:
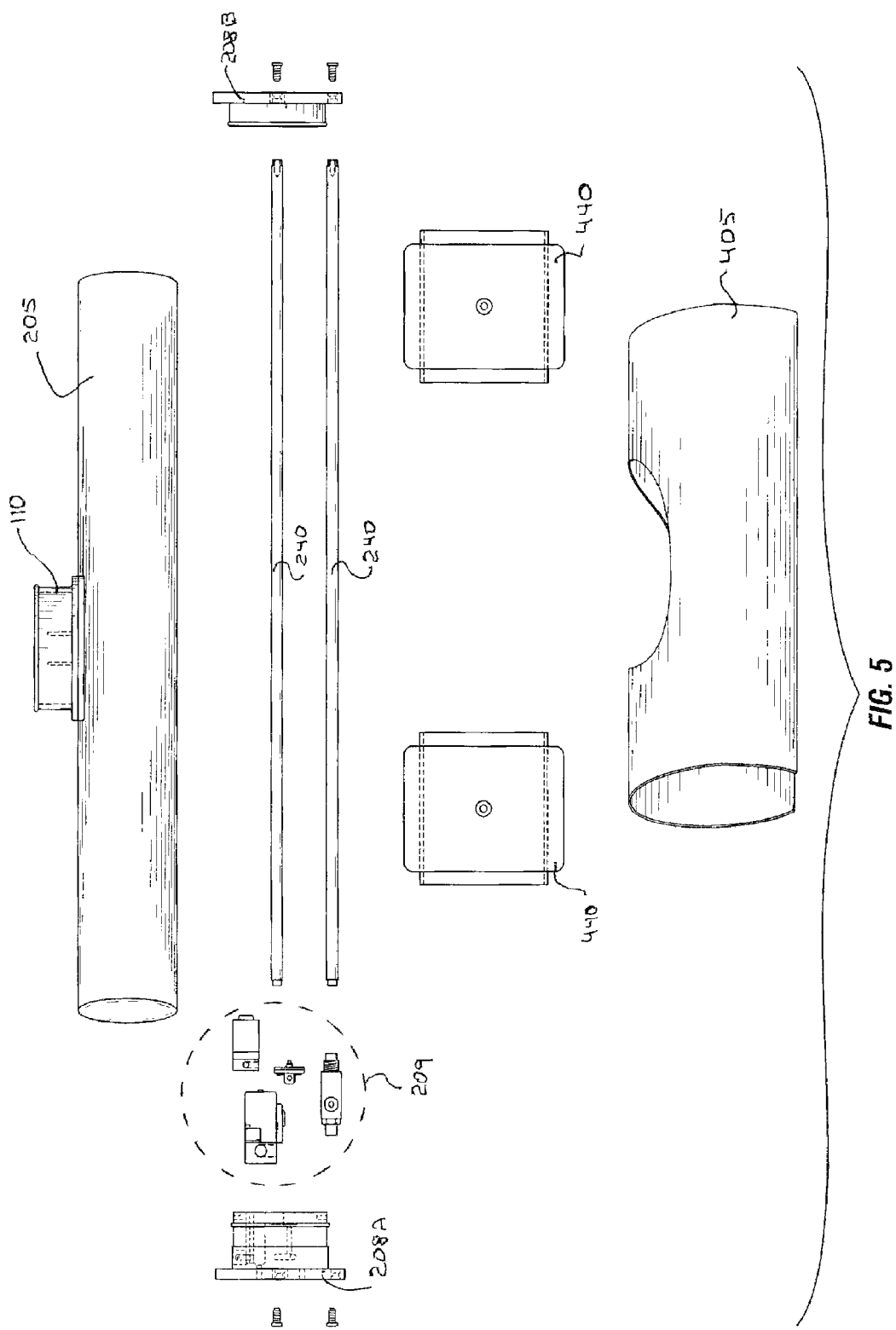
FIG. 5 illustrates the component parts of the flexible walled bladder housing subject of the invention.

FIG. 5 illustrates examples of the component parts of the flexible walled bladder housing subject of the device. The flexible housing 205 is a cylindrical shaped device having an inner annulus that can be fluid inflated. Attached to the wall of the housing is a bladder mounting flange 110. The flange forms a fluid sealed connection with the wall of the housing. The flange is mounted at the aperture of the housing wall that forms the bladder everting port. It is through this port that the bladder and repair material are everted (deployed) by fluid pressure into the lateral pipe.

Also illustrated in FIG. 5 are the solenoid and fluid regulators 209 that are installed within the housing proximate to the first housing base end 208A. (The first base end of the housing may be mounted to the motor structure used for positioning the housing relative to the pipe interface.) It will be appreciated that the device is attached to an external fluid supply source and electrical power source by fluid hoses and electrical cables.

The support rods 240 attachable to each housing base end 208A, 208B are also illustrated. Two actuator bladders 440 are dimensioned to fit over the housing, the housing base ends and the support rods. These actuator bladders are fluid inflatable. When inflated, they cause the support plate 405 and heating pad (not shown) to press the brim of the repair material to the inner wall of the main pipe.

In one embodiment, the actuator bladders are formed (vulcanized) onto rigid aluminum tube sections. The outside diameter of the support rods will match the internal diameter of the aluminum of the bladder tubes so that they contact in three places preventing movement and stop collars will then be attached to the support rods to prevent any lateral movement.

An existing device for installation of lateral repair linings utilizes a bladder that is everted out of the housing. The bladder is mounted on a flange component attached to a rigid fluid sealable housing. The flange controls or restricts the bladder to a 90 degree orientation to the housing. What this means is that the housing, positioned in a main pipe, permits the bladder to evert into a lateral pipe having a substantially 90 degree orientation to the main pipe.

Figure 6:
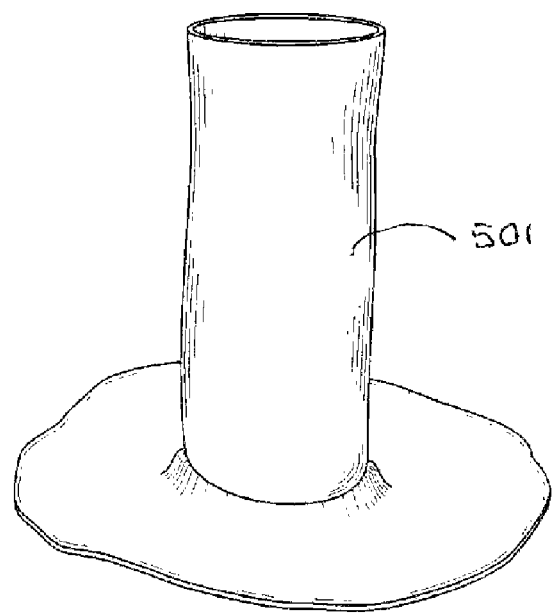
FIG. 6 illustrates a preformed repair material used in lining the interface of a lateral and main pipe having a 90 degree orientation.

This relationship may be illustrated by FIG. 6 illustrating a preformed repair material 501 used in lining the interface of a lateral and main pipe having a 90 degree orientation. The repair material contains a thermally responsive material that can be cured with the application of electrically resistive heat from the everting bladder. Note the repair material includes a tubular or cylindrical shaped portion that is installed within the lateral pipe. The everting bladder presses the repair material to the wall of the lateral pipe and the heat from the electrical heating elements within the bladder cure the repair material. The repair material also includes a brim or flange portion that is pressed against the wall of the main pipe at the pipe interface. The heating pad of the device, in conjunction with inflation of the actuator bladder, presses the brim to wall of the main pipe and cures the thermal responsive material within the repair material.

The present invention utilizes a bladder everting from a housing and mounted on a flange. However a component of the housing is made of flexible material. The housing material is inflatable, but preferably not elastomeric. The flexible walls permit bending of the housing walls to accommodate a lateral pipe interfacing with a main pipe at less than 90 degrees. (See FIG. 10)

Figure 7:
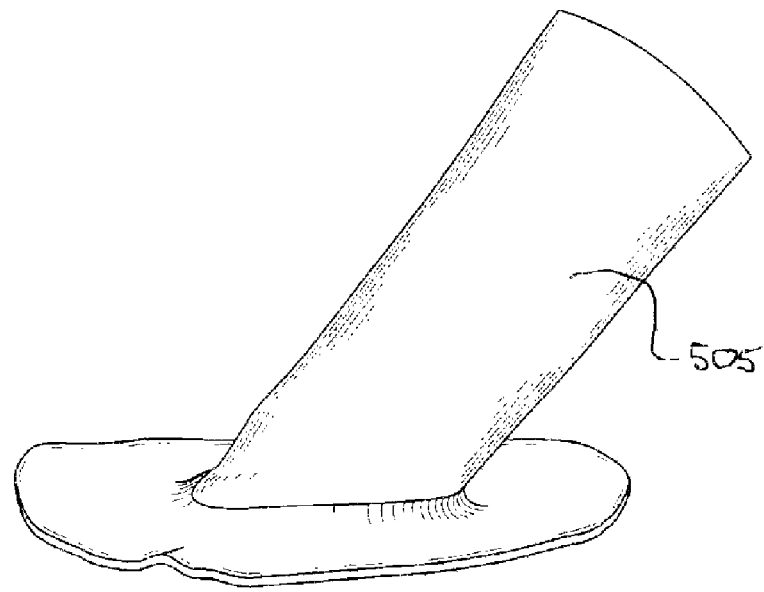
FIG. 7 illustrates a preformed lateral interface liner having an acute angle to the axis of the main pipe.

This relationship can be illustrated by FIG. 7 which illustrates a preformed lateral interface liner 505 having an acute angle to the axis of the main pipe. The tube or cylinder portion of the repair liner is installed within the lateral pipe. The round brim portion is pressed against the wall of the main pipe by action of the actuator bladders in combination with the support base component and heating pad.

It will be appreciated that the repair liner illustrated in FIG. 7 is inverted with the bladder and stored within the housing. When the fluid pressure increases, the bladder and liner begin to evert. The architecture of the everting repair liner may guide the bladder in the angle for deployment into the lateral pipe. For example, the angle of the repair material may guide the direction of the everting bladder.

In the preferred application, the device is maneuvered through a main pipe to a point proximate to the interface of a lateral pipe requiring repair. When properly positioned, fluid is added to the device. The increased fluid pressure causes a bladder (containing a repair material on the outer surface) to evert out of the housing of the device and to inflate into the interior of the lateral pipe. This inflation causes the repair material to be pressed to the inside wall of the lateral pipe.

Figure 8:
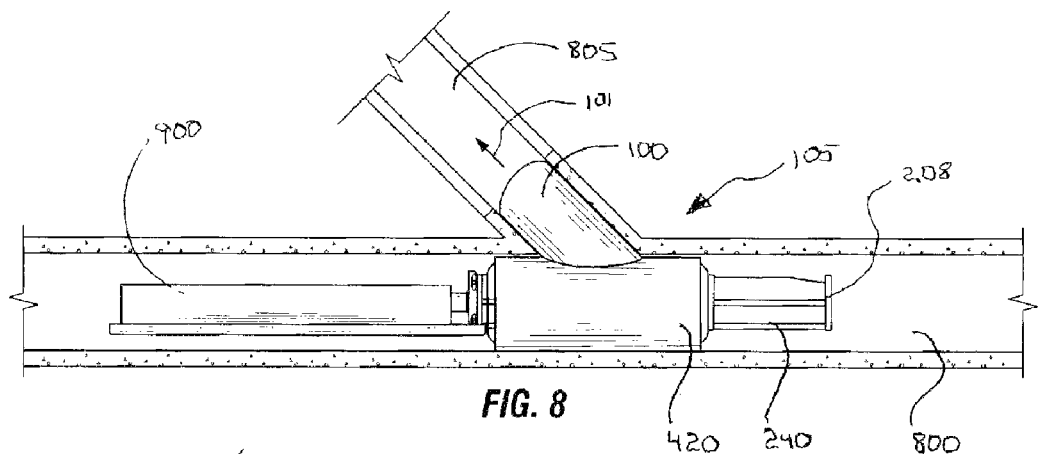
FIG. 8 illustrates the repair material and inflated bladder inserted into a lateral pipe intersecting with the main pipe at an acute angle.

The flexible portion of the housing wall allows the flange to form an angle other than 90 degrees to the orientation of the main pipe. FIG. 8 illustrates the repair material and inflated bladder 100 being everted into a lateral pipe 805 intersecting with the main pipe 800 at an acute angle. It will be appreciated that the repair material is covering the heating pad and the everting bladder. The direction of the deployment of the everting bladder within the lateral pipe is indicated by the directional arrow 101. The relationship of the device 105 and the motor structure 900 is also illustrated. Also illustrated are the support rods 240 and end plates 208 of the housing structure.

Figure 9:
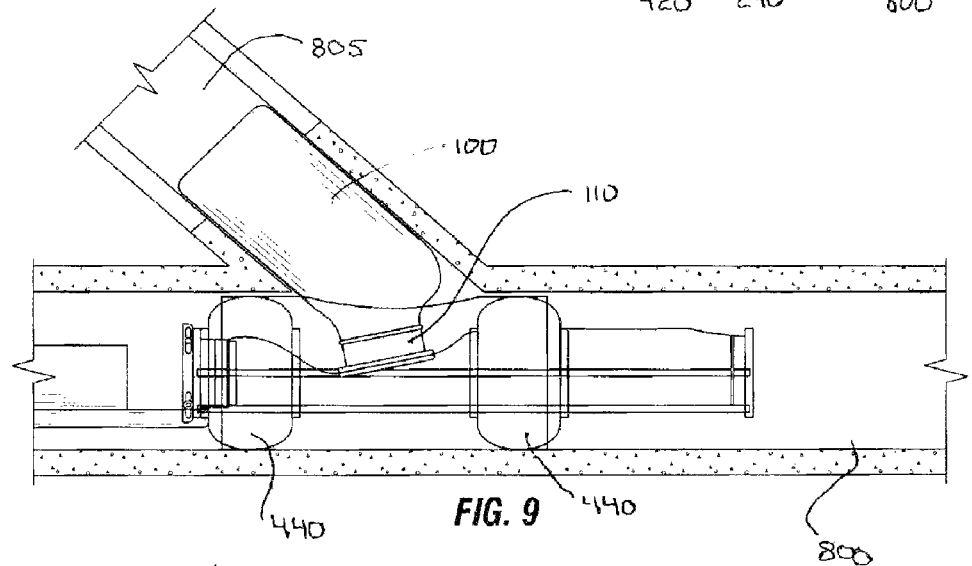
FIG. 9 illustrates a more detailed view of the housing with the actuator bladders pressed against the wall of the main pipe.
Figure 10:
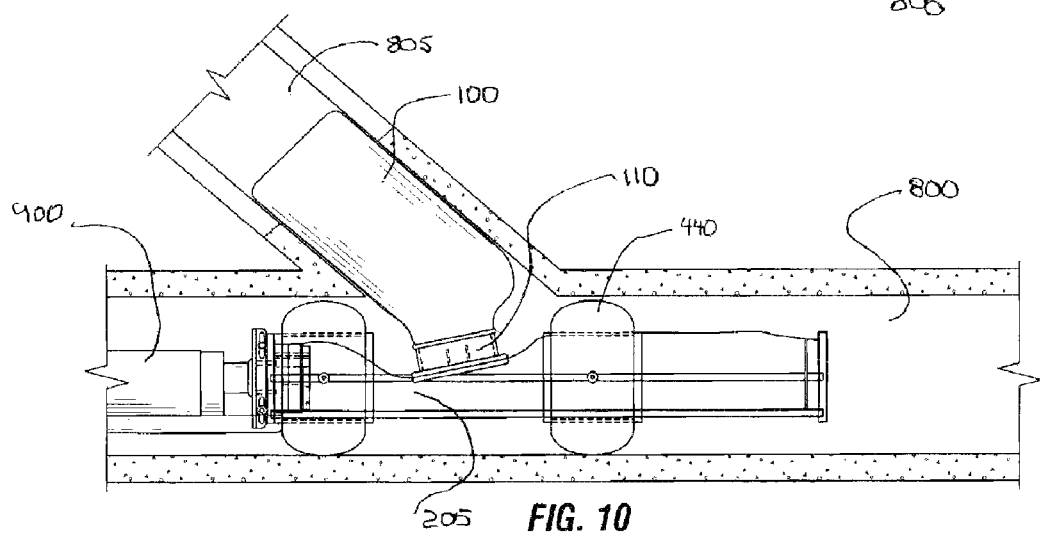
FIG. 10 illustrates the actuator bladder, the bladder mounting flange and the bend in the flexible housing wall as the beatable bladder everts into the angled lateral pipe.

FIG. 9 is a more detailed view of the housing, illustrating the actuator bladders 440 used to press the brim portion of the repair material to the wall of the main pipe 800. The acute angle (45°) of the lateral 805 to the main pipe is also shown. Particularly important is the "deformed" or bent shape of the flexible housing wall proximate to the bladder flange. This flexed shape of the housing wall permits the flange (to which the bladder is clamped), to be suitably oriented to the interface of the lateral pipe. This illustrates one advantage of the flexible housing wall. FIG. 10 illustrates the bladder mounting flange 110. FIG. 10 also illustrates the flexible wall of the housing 205 bending or "deforming" to accommodate the bladder 100 everting into the lateral at an acute angle to the main pipe. The relationship to the housing and everting bladder to the motor structure is also illustrated. The motor structure provides fluid and electrical power and connectors used in deploying the bladder from the housing and positioning the housing relative to the interface between the lateral and main pipe.

In one embodiment of the invention, the housing component may be removeably attached to a housing positioning structure (hereinafter "motor structure"). The motor structure provides controlled movement to the attached housing. The structure may contain motors for rotational, radial and longitudinal movement of the housing. Both the housing and the motor structure (together referred to as the "unit") are dimensioned to fit within the interior of the main pipe ("pipe"). The unit may be generally cylindrical in shape and has a longitudinal axis of orientation.

There exist and are known to persons skilled in the technology multiple commercial manufactures of components that can be adapted as motor structures. For example the robotic cutter manufactured by Try Tek Machine Works, Inc., of Hanover, Pa. Other manufacturers of equipment that can be adopted to serve as motor structures include the Cues Kangaroo manufactured by Cues, 3600 Rio Vista Avenue Orlando, Fla., and the Bowman Cutter and Bowman Jumbo Cutter manufactured by Bowman Tool Co. In one embodiment, the housing of the invention can be interchangeably mounted and used with alternate motor structures.

Drawings illustrating the relationship of the motor structure to the housing are contained in the separate non provisional application of the inventor filed May 9, 2007 which is incorporated herein by reference.

To accomplish sufficient structural rigidity to the device containing flexible walls, an external skeleton or support structure may be used. In one present embodiment, the housing comprises two rigid end pieces 207. Bonded or clamped to the end pieces is the flexible housing wall component 205. Traversing from the end plate 208 and each rigid end piece 207 may be housing support rods 240. The rods extend from each end and are on the outside of the flexible housing. The rods may also serve to protect the flexible housing wall. The rods are attached to each end and hold the housing at a fixed length. Within the rigid end pieces of the housing, necessary components may be installed for control of the fluid inflation devices.

The housing end caps can be made of a suitable rugged and durable material such as resinous plastic or PVC. In a preferred embodiment, the end caps are fluid sealably attached to a rigid cylindrical portion of the housing. These rigid housing components may also be made of materials such a resinous plastic or PVC. (Electrical control/communication components and fluid control components may be installed within the rigid cylindrical portion of the housing.) The accompanying drawings illustrate a fluid access port within the rigid housing component.

A portion of the housing is made of a flexible but fluid impermeable material. The flexible wall component is fluid sealably attached to the rigid housing wall component. The cylindrical shaped flexible housing component may be made of a fabric reinforced and fluid impermeable material such as a woven polyester fabric reinforced silicone. Silicone is advantageous due to its non-stick properties (to minimize adhesion of the resin impregnated liner). In one embodiment the material has a 15% elongation. The flexible housing material may be also made from natural rubbers, SBR, plasticized PVC. The thickness may be 0.040 inches. Attached to the flexible housing wall will be a bladder mounting flange 110. This can be a rigid component. It can comprise a collar over which the flexible and beatable elastomeric bladder 100 can be installed.

It will be appreciated that the flexible nature of the housing wall permits the flange (and thereby the everting heating bladder) to assume multiple angles relative to the longitudinal axis of the device. This permits the everting bladder to inflate within a lateral pipe that forms a juncture with the main pipe that is other than 90 degrees. The angle of orientation may in part be controlled by the shape of the everting repair liner.

In a preferred embodiment, the cylindrical shaped housing in made from a calendared sheet wherein the ends have a smaller diameter than the middle section. This is advantageous since attachment of the bladder mounting flange acts to "narrow" the diameter of the housing. In one embodiment, the end diameter is approximately 3.5 inches and the middle diameter is approximately 5 inches.

Also, it will be appreciated that the beatable and inflatable bladder is stored and transported within the housing. This minimizes damage or contamination of the bladder and repair material while maneuvered through the interior of a pipe.

The housing, including the flexible wall component of the housing, may be constructed of resilient and tear or damage resistant material. The flexible housing material may be of a lower durometer than the bladder material. The "softer" sides of the housing wall will permit the housing wail to yield to allow the everting bladder to be correctly positioned to the angle of the intersecting lateral pipe.

The external support rods also provide protection to the device and facilitate maneuvering of the device through the pipe.

The bladder may contain electric components for resistive heating of the repair device. (The repair device is carried on the bladder during cure and installation to a lateral pipe wall.) The flange component (attached to the flexible housing) will contain electrical connective components in communication with the resistive heating components within the bladder. These connective components can be placed in electrical communication with an external power source. The electrical components may fit through the housing flange and extend to electrical contacts within the bladder.

The housing may contain further electrical connective component suitable for attachment to an electrical power cable that may extend through the pipe to a power source. The housing may also contain fluid regulating devices such as solenoids and regulators for the control of inflation fluids, e.g., air. The electrical connective components and fluid regulating components may be installed within the rigid wall portion of the housing.

The bladder will be everted from the housing by increase of fluid pressure from an external fluid supply source, e.g., air compressor. The bladder may be deflated by suitable fluid controls such as a vacuum pump. This pump may be a pneumatically activated venturi style pump located with the housing and controlled by a selector solenoid. When deflated, the bladder may be retracted into the housing by use of a tether attached to the end of the bladder. This tether may extend from the housing and be controlled remotely. It will be appreciated that the length of the tether extending from the housing will shorten when the bladder is everted from the housing. This change in length can be used to determine when the bladder is fully everted into a lateral pipe.

The device illustrated in the photos and figures constitute one embodiment of the invention. The invention is not limited to the specific embodiment disclosed and other variations or modifications are possible that are within the scope of this invention.

The invention claimed is:

1. An in situ main pipe lateral interface pipe repair device comprising:
   (a) a housing comprising an inner annulus and fluid inflatable flexible walls and further comprising a first end and a second end wherein the first end and second end are held in fixed orientation by a plurality of support rods on the outside of the housing and protecting the housing and the support rods extending to housing end plates;
   (b) a bladder mounting flange fluid sealably attached to the flexible housing wall;
   (c) an electrically heatable and fluid inflatable bladder removeably attached to the mounting flange and dimensioned to fit within the housing when the bladder is deflated and evertable through the bladder mounting flange into a lateral pipe when inflated;
   (d) at least one inflatable actuator bladder fitting over the flexible housing wall and to hold the device in the main pipe;
   (e) a stiff deformable support base placed over the actuator bladder;
   (f) an electrically heated component placed over the support base that can be pressed and heat a repair material brim against the wall of the main pipe.

2. The pipe repair device of claim 1 comprising an electrically heated component that can be pressed to the main pipe by inflation of the actuator bladder.

3. The pipe repair device of claim 1 further comprising a fluid connection for inflation and deflation of the housing and actuator bladder.

4. The pipe repair device of claim 1 further comprising an electrical connection and communication wires to heat the electrical heating components and bladder.

5. The pipe repair device of claim 1 further comprising a motor structure.

6. An in situ pipe lateral interface pipe repair device comprising
   a) a housing comprising an inner annulus and fluid inflatable flexible walls and a plurality of outer support rods;
   b) a rigid bladder mounting flange fluid sealably attached to the flexible housing wall;
   c) a heatable and inflatable bladder fluid sealably attached to the bladder mounting flange and further comprising the bladder everting from fluid pressure from within the housing and through the mounting flange; and
   d) a heatable component attached to a support base mounted on the exterior of the flexible housing.

7. The device of claim 6 further comprising at least one inflatable actuator bladder.

8. The device of claim 6 further comprising cylinder shaped housing having a diameter in the middle of the housing wider than the diameter of the housing proximate to the housing ends.

9. A method of in situ installation of repair material at the juncture of a lateral pipe to a main pipe comprising the steps of:
   a) installing a repair material containing a thermally responsive material on tG an inflatable and heatable bladder mounted on a rigid mounting flange attached to a flexible walled housing,
   b) inverting the bladder containing the repair material into the housing;
   c) positioning the housing at the juncture of the lateral and main pipe;
   d) inflating the housing and bladder sufficient that the bladder and repair material evert from the housing and the flexible housing walls bend to allow the inflated bladder to extend at an acute angle to the housing into the lateral pipe;
   e) inflating at least one actuator bladder to press the support plate and a heating pad against the main pipe;
   f) energizing electrical heating elements within the bladder to cure the repair material within the lateral pipe;
   g) pressing a repair material brim with a support plate and heating pad positioned by the actuator bladder; and
   h) energizing the heating pad to cure the repair material brim.

* * * * *